(12) United States Patent
Mok et al.

(10) Patent No.: US 11,239,933 B2
(45) Date of Patent: Feb. 1, 2022

(54) SYSTEMS AND METHODS FOR TRANSPORTING CONSTANT BIT RATE CLIENT SIGNALS OVER A PACKET TRANSPORT NETWORK

(71) Applicant: Microsemi Semiconductor ULC, Kanata (CA)

(72) Inventors: Winston Mok, Vancouver (CA); Richard Tsz Shiu Tse, Vancouver (CA)

(73) Assignee: Microsemi Semiconductor ULC, Kanata (CA)

( * ) Notice: Subject to any disclaimer, the term of this patent is extended or adjusted under 35 U.S.C. 154(b) by 21 days.

(21) Appl. No.: 16/935,143

(22) Filed: Jul. 21, 2020

(65) Prior Publication Data

US 2021/0234625 A1    Jul. 29, 2021

Related U.S. Application Data

(60) Provisional application No. 62/966,628, filed on Jan. 28, 2020.

(51) Int. Cl.
*H04J 3/06* (2006.01)
*H04J 3/16* (2006.01)

(52) U.S. Cl.
CPC .......... *H04J 3/0632* (2013.01); *H04J 3/0658* (2013.01); *H04J 3/0697* (2013.01); *H04J 3/1617* (2013.01); *H04J 2203/0085* (2013.01)

(58) Field of Classification Search
CPC ...... H04J 3/0632; H04J 3/0658; H04J 3/0697; H04J 3/1617; H04J 2203/0085
See application file for complete search history.

(56) References Cited

U.S. PATENT DOCUMENTS 5,343,482 A    8/1994   Penner et al.
5,361,277 A   11/1994   Grover
             (Continued)

FOREIGN PATENT DOCUMENTS

DE    102017222442 A1    6/2019
EP         1145477 A1   10/2001
JP         3565600 B2    9/2004

OTHER PUBLICATIONS

BA34003 Datasheet (Integrated Device Technology, Inc) Jun. 17, 2019 (Jun. 17, 2019).
(Continued)

*Primary Examiner* — Huy D Vu
*Assistant Examiner* — Bailor C. Hsu
(74) *Attorney, Agent, or Firm* — Glass & Associates; Kenneth Glass; Molly Sauter

(57) ABSTRACT

A method for transporting Ethernet frame packets assembled from a constant bit rate (CBR) client stream from an ingress network node to an egress network node, each Ethernet frame packet including a payload region having a number of bytes of CBR client data from the CBR client stream determined by a client rate value of the CBR client stream. The method including synchronizing a reference clock signal and a ToD in the ingress network node to a packet-based time distribution mechanism, independently synchronizing a reference clock signal and a ToD in the egress network node to the packet-based time distribution mechanism, for an Ethernet frame packet assembling a presentation time packet including a sequence number and a presentation ToD for the Ethernet frame packet, and transmitting the Ethernet frame packets and the presentation time packet to the egress network node over the packet transport network.

20 Claims, 8 Drawing Sheets

(56) References Cited

U.S. PATENT DOCUMENTS

| | | |
|---|---|---|
| 5,371,765 A | 12/1994 | Guilford |
| 5,600,824 A | 2/1997 | Williams et al. |
| 5,640,398 A | 6/1997 | Carr et al. |
| 5,838,512 A | 11/1998 | Okazaki |
| 5,850,422 A | 12/1998 | Chen |
| 5,905,766 A | 5/1999 | Nguyen |
| 6,044,122 A | 3/2000 | Ellersick et al. |
| 6,052,073 A | 4/2000 | Carr et al. |
| 6,138,061 A | 10/2000 | McEnnan et al. |
| 6,150,965 A | 11/2000 | Carr et al. |
| 6,188,699 B1 | 2/2001 | Lang et al. |
| 6,333,935 B1 | 12/2001 | Carr et al. |
| 6,345,052 B1 | 2/2002 | Tse et al. |
| 6,359,479 B1 | 3/2002 | Oprescu |
| 6,584,521 B1 | 6/2003 | Dillabough et al. |
| 6,603,776 B1 | 8/2003 | Fedders et al. |
| 6,668,297 B1 | 12/2003 | Karr et al. |
| 6,671,758 B1 | 12/2003 | Cam et al. |
| 6,744,787 B1 | 6/2004 | Schatz et al. |
| 6,820,159 B2 | 11/2004 | Mok et al. |
| 6,823,001 B1 | 11/2004 | Chea |
| 6,870,831 B2 | 3/2005 | Hughes et al. |
| 7,117,112 B2 | 10/2006 | Mok |
| 7,161,999 B2 | 1/2007 | Parikh |
| 7,165,003 B2 | 1/2007 | Mok |
| 7,187,741 B2 | 3/2007 | Pontius et al. |
| 7,203,616 B2 | 4/2007 | Mok |
| 7,239,650 B2 | 7/2007 | Rakib et al. |
| 7,239,669 B2 | 7/2007 | Cummings et al. |
| 7,295,945 B2 | 11/2007 | Mok |
| 7,388,160 B2 | 6/2008 | Mok et al. |
| 7,417,985 B1 | 8/2008 | McCrosky et al. |
| 7,468,974 B1 | 12/2008 | Carr et al. |
| 7,492,760 B1 | 2/2009 | Plante et al. |
| 7,593,411 B2 | 9/2009 | McCrosky et al. |
| 7,656,791 B1 | 2/2010 | Mok et al. |
| 7,668,210 B1 | 2/2010 | Mok et al. |
| 7,751,411 B2 | 7/2010 | Cam et al. |
| 7,772,898 B2 | 8/2010 | Cheung |
| 7,807,933 B2 | 10/2010 | Mok et al. |
| 7,817,673 B2* | 10/2010 | Scott .................. H04J 3/0664 370/503 |
| 8,010,355 B2 | 8/2011 | Rahbar |
| 8,023,641 B2 | 9/2011 | Rahbar |
| 8,085,764 B1 | 12/2011 | McCrosky et al. |
| 8,243,759 B2 | 8/2012 | Rahbar |
| 8,335,319 B2 | 12/2012 | Rahbar |
| 8,413,006 B1 | 4/2013 | Mok et al. |
| 8,428,203 B1 | 4/2013 | Zortea et al. |
| 8,483,244 B2 | 7/2013 | Rahbar |
| 8,542,708 B1 | 9/2013 | Mok et al. |
| 8,599,986 B2 | 12/2013 | Rahbar |
| 8,774,227 B2 | 7/2014 | Rahbar |
| 8,854,963 B1 | 10/2014 | Muma et al. |
| 8,913,688 B1 | 12/2014 | Jenkins |
| 8,957,711 B2 | 2/2015 | Jin et al. |
| 8,971,548 B2 | 3/2015 | Rahbar et al. |
| 8,976,816 B1 | 3/2015 | Mok et al. |
| 8,989,222 B1 | 3/2015 | Mok et al. |
| 9,019,997 B1 | 4/2015 | Mok et al. |
| 9,025,594 B1 | 5/2015 | Mok et al. |
| 9,209,965 B2 | 12/2015 | Rahbar et al. |
| 9,276,874 B1 | 3/2016 | Mok et al. |
| 9,313,563 B1 | 4/2016 | Mok et al. |
| 9,374,265 B1 | 6/2016 | Mok et al. |
| 9,444,474 B2 | 9/2016 | Rahbar et al. |
| 9,473,261 B1 | 10/2016 | Tse et al. |
| 9,503,254 B2 | 11/2016 | Rahbar et al. |
| 9,525,482 B1 | 12/2016 | Tse |
| 10,069,503 B2 | 9/2018 | Zhang et al. |
| 10,079,651 B2 | 9/2018 | Ramachandra |
| 10,104,047 B2 | 10/2018 | Muma et al. |
| 10,128,826 B2 | 11/2018 | Jin et al. |
| 10,250,379 B2 | 4/2019 | Haddad et al. |
| 10,432,553 B2 | 10/2019 | Tse |
| 10,594,423 B1* | 3/2020 | Anand .................. H04J 3/0661 |
| 10,608,647 B1 | 3/2020 | Ranganathan et al. |
| 10,715,307 B1 | 7/2020 | Jin |
| 2001/0056512 A1 | 12/2001 | Mok et al. |
| 2005/0110524 A1 | 5/2005 | Glasser |
| 2006/0056560 A1 | 3/2006 | Aweya et al. |
| 2006/0064716 A1* | 3/2006 | Sull ..................... G06F 16/7857 725/37 |
| 2006/0076988 A1 | 4/2006 | Kessels et al. |
| 2007/0036173 A1 | 2/2007 | McCrosky et al. |
| 2007/0064834 A1 | 3/2007 | Yoshizawa |
| 2007/0132259 A1 | 6/2007 | Ivannikov et al. |
| 2008/0000176 A1 | 1/2008 | Mandelzys et al. |
| 2008/0202805 A1 | 8/2008 | Mok et al. |
| 2010/0052797 A1 | 3/2010 | Carley et al. |
| 2011/0095830 A1 | 4/2011 | Tsangaropoulos et al. |
| 2012/0158990 A1 | 6/2012 | Losio et al. |
| 2014/0055179 A1 | 2/2014 | Gong et al. |
| 2014/0139275 A1 | 5/2014 | Dally et al. |
| 2016/0277030 A1 | 9/2016 | Burbano et al. |
| 2016/0301669 A1 | 10/2016 | Muma et al. |
| 2017/0244648 A1 | 8/2017 | Tse |
| 2018/0131378 A1 | 5/2018 | Haroun et al. |
| 2018/0159541 A1 | 6/2018 | Spijker |
| 2018/0183708 A1* | 6/2018 | Farkas ................. H04L 45/42 |
| 2020/0166912 A1 | 5/2020 | Schneider et al. |

OTHER PUBLICATIONS

Abdo Ahmad et al: "Low-Power Circuit for Measuring and Compensating Phase Interpolator Non-Linearity", 2019 IEEE 10th Annual Information Technology, Electronics and Mobile Communication Conference (IEMCON), IEEE, Oct. 17, 2019 (Oct. 17, 2019), pp. 310-313.

PCT/CA2020/000102, International Search Report and Written Opinion, Canadian Intellectual Property Office, dated Oct. 6, 2020.

U.S. Appl. No. 16/563,399, filed Sep. 6, 2019, Qu Gary Jin.

U.S. Appl. No. 16/795,520, filed Feb. 19, 2020, Peter Meyer.

U.S. Appl. No. 62/953,301, filed Dec. 24, 2019, Peter Meyer.

* cited by examiner

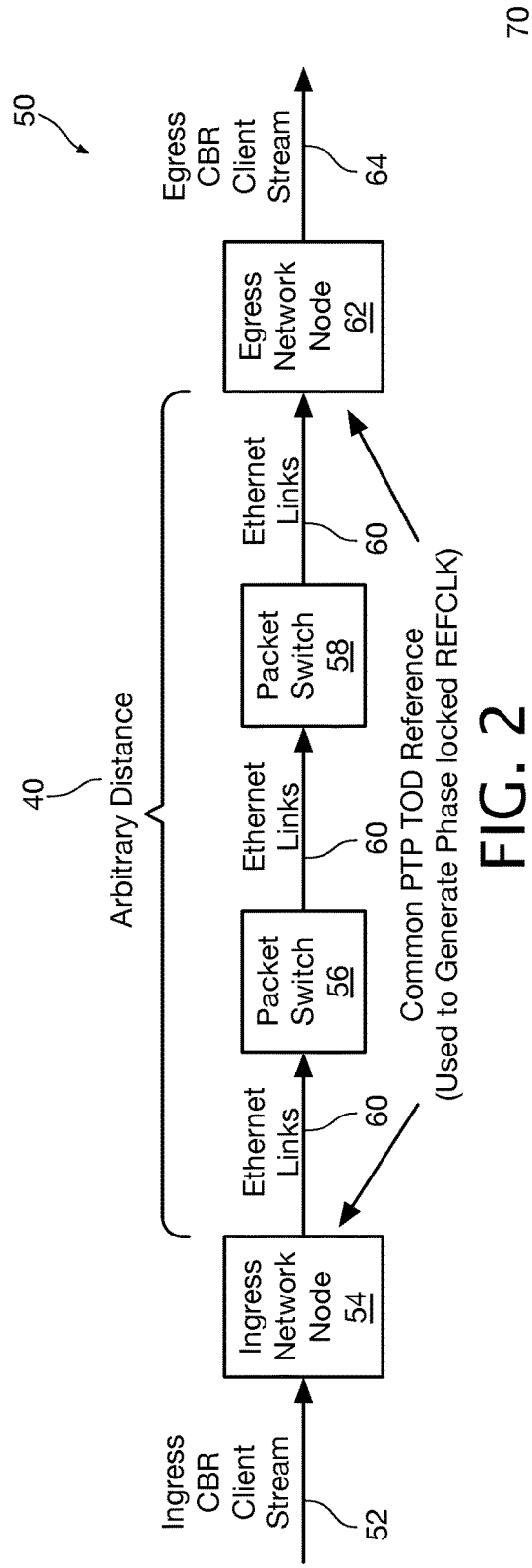

SYSTEMS AND METHODS FOR TRANSPORTING CONSTANT BIT RATE CLIENT SIGNALS OVER A PACKET TRANSPORT NETWORK

CROSS-REFERENCE TO RELATED APPLICATIONS

The present application claims priority to U.S. Provisional Patent Application Ser. No. 62/966,628, filed on Jan. 28, 2020, the contents of which are incorporated by reference herein in their entirety.

BACKGROUND

The present invention relates to packet transport networks. More particularly, the present invention relates to systems and methods for transporting constant bit rate (CBR) client signals over a packet transport network.

Transport networks can be divided into two broad classes, time division multiplexing (TDM) networks, such as an optical transport network (OTN), and packet transport networks, such as an Ethernet network. A number of solutions already exist for mapping packet transport network clients into TDM networks. For example, it is known to map a 10 Gbps Ethernet signal onto an Optical Data Unit 2e (ODU2e) within the OTN hierarchy.

As the amount of packet transport network traffic grows, in proportion to the total traffic volume in the transport network, it would be economically advantageous to migrate the transport network towards being a packet transport network. However, there remain a large number of constant bit rate (CBR) clients in the transport network and continuing to support these CBR clients remains economically important.

FIG. 1 is a block diagram illustrating a known application space where various CBR clients, which are segmented and packetized, and packet transport network clients (Packet Clients) are multiplexed onto packet transport network optical links, such as Ethernet. As shown, the CBR clients may include storage area network (SAN) clients, synchronous optical network/synchronous digital hierarchy (SONET/SDH) clients, synchronous transfer signal/synchronous transport module (STS-N/STM-M) clients, OTN clients, optical data unit (ODUk/ODUflex) clients, video clients and Ethernet clients.

A packet transport network can transmit CBR client data by receiving the CBR client data stream at an ingress network node and assembling the CBR client data stream into CBR client data packets, which are then routed over the packet transport network to an egress network node. The CBR client data packets received by the egress network node are then reassembled into the CBR client stream. However, the phase and frequency information of the CBR client stream may be lost during the process of assembly of the CBR client stream into the CBR client data packets. Without knowing the phase and frequency information of the CBR client data, the egress network node is unable to correctly reassemble the CBR client data stream.

Various methods are known in the art for signaling the phase and frequency information of the CBR client data stream from the ingress network node to the egress network node. Timing techniques are known for constructing packets with a fixed amount of CBR client data, however these methods are subject to the undesirable effects of packet delay variation (PDV) in the packet transport network. Timing techniques are also known for signaling the phase and frequency by timestamping each packet. However, timestamping introduces additional processing requirements at the egress network node, reduces the available bandwidth and requires that the ingress network node and the egress network node share a common reference clock.

Another solution is disclosed in U.S. Pat. No. 9,019,997 in which a timing card generates a reference clock that is coupled to all the ingress network nodes and egress network nodes in the system. One shortcoming of this solution is that the ingress network nodes and egress network nodes must be in reasonable proximity to one another for the system to operate properly because they all share a common wired reference clock REFCLK signal. As a result, it does not work in network environments where the ingress network nodes and egress network nodes are not housed in the same enclosure or are not otherwise located in reasonable proximity to one another to allow use of such a common wired connection for the REFCLK signal.

Accordingly, there is a need in the art for a system and method that would allow for transporting constant bit rate (CBR) client signals and their required timing information over a packet transport network having ingress network nodes and egress network nodes that are separated from one another by arbitrary distances.

SUMMARY OF THE INVENTION

The method and apparatus of the present invention allows transporting Ethernet frame packets having different payload sizes assembled from a constant bit rate (CBR) client stream across a packet transport network without the need for supplying a common hardwired time reference signal to both the ingress network node and the egress network node. Further the Ethernet frame packets provide an advantage because they do not need to include a timestamp field.

In one embodiment, the present invention provides a method for transporting a constant bit rate (CBR) client stream over a packet transport network. The method includes, synchronizing a reference clock signal and a time of day (ToD) at an ingress network node of a packet transport network to a packet-based time distribution mechanism, independently synchronizing a reference clock signal and a ToD at an egress network node of the packet transport network to the packet-based time distribution mechanism. The method further includes, assembling a presentation time packet for an Ethernet frame packet of a CBR client stream at the ingress network node, the presentation time packet including a sequence number and a presentation time for the Ethernet frame packet, wherein the Ethernet frame packet comprises a payload region having a number of bytes of CBR client data from the CBR client stream and transmitting the Ethernet frame packet and the presentation time packet to the egress network node over the packet transport network. In particular, the number of bytes of CBR client data from the CBR client stream included in each of the Ethernet frame packets is determined by a payload size decision related to a client rate value of the CBR client stream.

In an additional embodiment, the present invention provides a system for transporting Ethernet frame packets assembled from a constant bit rate (CBR) client stream over a packet transport network. The system includes, an ingress network node coupled to an egress network node through a packet transport network, a timing generator in the ingress network node that generates a reference clock signal and a time of day (ToD) that are synchronized by a packet-based time distribution mechanism, a timing generator in the egress network node that independently generates a reference clock signal and a ToD that are synchronized to the packet-based time distribution mechanism. The system further includes, a packet assembler in the ingress network node, the packet assembler configured to receive CBR client data from a CBR client stream and to assemble Ethernet frame packets from the CBR client data, each Ethernet frame packet including a payload region having a number of bytes of CBR client data from the CBR client stream, wherein the number of bytes of CBR client data is determined by a payload size decision related to a client rate value of the CBR client stream. The packet assembler is further configured to generate a sequence number (SQ) for each Ethernet frame packet, a presentation time packet generator in the ingress network node coupled to the packet assembler, the presentation time packet generator configured to generate a presentation time packet for a Ethernet frame packet, the presentation time packet including the sequence number (SQ) of the Ethernet frame packet and a presentation time for the Ethernet frame packet, and a multiplexer coupled to the packet assembler and to the presentation time packet generator, the multiplexer arranged to multiplex the generated presentation time packet and the Ethernet frame packets for transmission to the packet transport network.

In various embodiments, the present invention provides the transportation of constant bit rate (CBR) client signals and their required timing information over a packet transport network having ingress network nodes and egress network nodes that are separated from one another by arbitrary distances.

BRIEF DESCRIPTION OF THE FIGURES

The invention will be explained in more detail in the following with reference to embodiments and to the drawing in which are shown:

FIG. 2 is a block diagram showing ingress and egress network nodes separated by an arbitrary distance synchronized to an externally provided common time of day (ToD) reference source to phase lock the reference clock (REFCLK) at the ingress and egress network nodes. in accordance with an embodiment of the present invention;

FIG. 3 is a diagram illustrating a CBR client data Ethernet frame packet exemplifying the format for packets used to carry CBR client data, in accordance with an embodiment of the present invention;

FIG. 4 is a diagram illustrating a presentation time packet formatted in accordance with an embodiment of the invention;

DETAILED DESCRIPTION OF THE INVENTION

Figure 1:
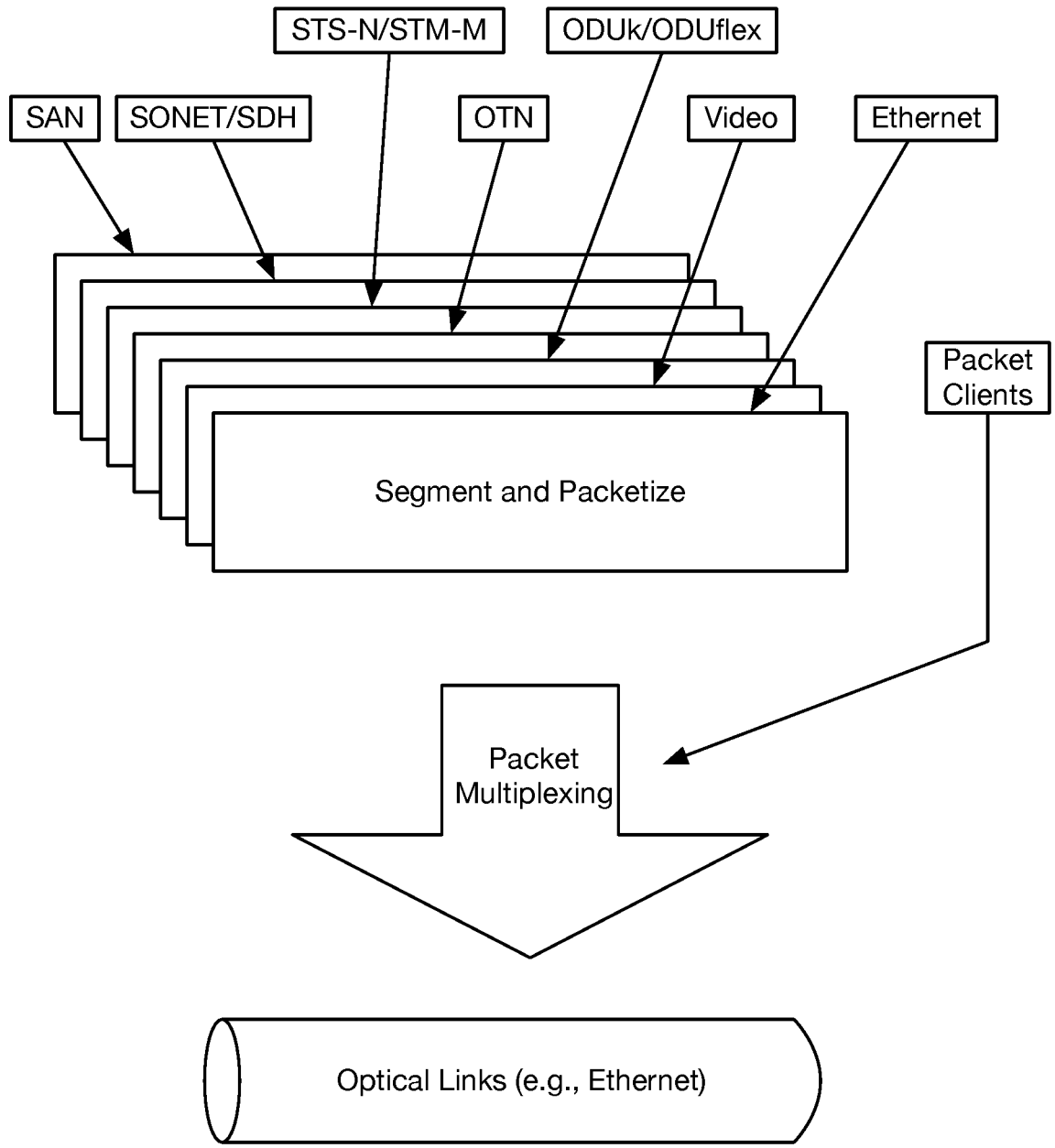
FIG. 1 is a block diagram that shows a known application space where various CBR clients and Packet clients are being multiplexed onto packet transport network links.

Persons of ordinary skill in the art will realize that the following description is illustrative only and not in any way limiting. Other embodiments will readily suggest themselves to such skilled persons.

Referring now to FIG. 2, a block diagram shows a transport network 50 in accordance with an embodiment of the present invention wherein the transport network 50 includes an ingress network node 54 separated from an egress network node 62 by an arbitrary distance 40. An ingress CBR client stream 52 is coupled to the ingress network node 54. While only a signal CBR client stream 52 is depicted, it is to be understood that multiple CBR client streams 52 may be received at the ingress network node 54. Persons of ordinary skill in the art will appreciate that the ingress network node 54 may be disposed on an integrated circuit, either by itself or along with other components. The output of ingress network node 54, representing ingress CBR client stream 52, as will be described further below, is sent through an arbitrary number of packet switches represented by reference numerals 56 and 58 that are coupled together by respective Ethernet links 60 and eventually received at an egress network node 62 where the CBR client stream is reconstructed and output as an egress CBR client stream 64. Persons of ordinary skill in the art will appreciate that the egress network node 62 may also be disposed on an integrated circuit, either by itself or along with other components.

The ingress network node 54 packetizes the ingress CBR client stream 52 by segmenting the ingress CBR client stream 52 into Ethernet frame packets of variable size. The Ethernet frame packets generated from the CBR client stream 52 are assembled by the ingress network node 54, on average, once every packet period, and the payload size of each packet can vary between B−N, B, and B+N bytes. Packet switch 56 and packet switch 58 transfer the Ethernet frame packets generated from the CBR client stream 52 assembled by the ingress network node 54 via respective Ethernet links 60 in the transport network 50 towards the egress network node 62, according to known routing algorithms, which are outside the scope of this disclosure. The packets may be transmitted an arbitrary distance 40 from the ingress network node 54 to the egress network node 62, as the ingress network node 54 and egress network node 62 may be, for example, thousands of miles apart. As such, there is no common wired reference clock (REFCLK) signal shared by the ingress network node 54 and the egress network node 62.

The egress network node 62 reconstructs the CBR client stream from the variable sized Ethernet frame packets. Ingress network node 54 and egress network node 62 are provided with an external common time of day (ToD) reference, for example, via IEEE 1588 PTP mechanisms, as is known in the art. From the common ToD reference, the ingress network node 54 and egress network node 62 can additionally generate their own respective REFCLK signals that are phase locked to each other.

Referring now to FIG. 3, a diagram shows an example of an Ethernet frame packet 70 of a CBR client stream that may be employed in an embodiment of the invention. The Ethernet frame packet 70 begins with a preamble field 72, as is known in the art, followed by a start-of-frame delimiter field 74. Each Ethernet frame packet 70 includes a destination MAC address field 76, a source MAC address field 78, and an Ethertype/Length field 80, as is also known in the art. The CBR overhead field 82 carries overhead information specific to the application of CBR clients, such as an ID of the CBR client stream, the sequence number (SQ) of the Ethernet frame packet 70 within the CBR client stream, and error recovery information.

The CBR client payload field 84 is a variable-length field and can be expanded or contracted to accommodate the bit rate of the client. Three lengths are shown, B−N, B and B+N bytes, where B is the number of bytes and N is an integer. U.S. Pat. No. 9,019,997 teaches an example where N=1. Assuming that the length of a CBR client payload field is B at a specified bit rate, for CBR clients having a lower bit rate than the specified bit rate, the length of the CBR client payload field in bytes is reduced for some CBR client Ethernet frame packets. For CBR clients having a higher bit rate than the specified bit rate, the length of the CBR client payload field is increased for some CBR client data Ethernet frame packets. However, to enable sufficient range of bit rate offset (ppm offset) with large packet lengths, a correspondingly larger N is needed. Selecting values for B and N for any given packet transport system is well within the level of ordinary skill in the art.

The frame check sequence field 86 follows the client payload field 84, as is known in the art. An interpacket gap 88 shown in dashed lines following the packet, as is known in the art and is not a part of the Ethernet frame packet 70.

The Ethernet frame 70 packet differs in several respects from CBR client payload packets known in the prior art. First, because the prior art solution disclosed in U.S. Pat. No. 9,019,997 does not transport CBR client payload packets across a packet transport network having an arbitrary distance between the ingress network node and the egress network node, the packets used in that solution do not include Ethernet overhead, such as the preamble field 72, the start-of-frame delimiter field 74, the destination MAC address field 76, the source MAC address field 78, the Ethertype/Length field 80, and the frame check sequence field 86 that follows the client payload field 84. In addition, the prior art solution requires a timestamp field within the CBR overhead field 82, which is not required in the operation of the present invention.

Over time, the average rate of Ethernet frame packet generation by the ingress network node 54 is kept constant, at one packet every packet period (Tp). Tp can be measured as multiple of periods of a reference clock inside the ingress network node 54. For example, if the ingress CBR client stream 52 bit rate is faster than nominal, then the CBR packet payload sizes may be set to be, on average, larger than nominal. In this way, the packet can accommodate the higher CBR client data bit rate without having to increase the number of packets generated per unit of time. Similarly, if the ingress CBR client stream 52 bit rate is slower than nominal, then the CBR client data packet payload sizes may be set to be smaller, on average, than nominal. This way, the packets can accommodate the lower ingress CBR client stream 52 bit rate without having to decrease the number of packets generated per unit of time. Methods for generating packets having sizes that track the CBR client data bit rate and provide good noise shaping properties are well known in the art.

Referring now to FIG. 4, an illustrative presentation time packet 90 is presented formatted in accordance with an embodiment of the invention. In accordance with the present invention, presentation time packets 90 are periodically generated and sent from the ingress network node 54 to the egress network node 62 for purposes of system initialization and for recovery in case the connection between the ingress network node 54 and the egress network node 62 is temporarily lost. The presentation time packet 90 begins with a preamble field 92, as is known in the art, followed by a start-of-frame delimiter field 94. Each presentation time packet 90 includes a destination MAC address field 96, a source MAC address field 98, and an Ethertype/Length field 100, as is known in the art. The ID field 102 identifies the CBR client stream whose presentation time 106 is being identified in the presentation time packet 90. The SQ field 104 identifies the sequence number of the Ethernet frame packet 70 in the CBR client stream whose presentation time 106 is being identified in the presentation time packet 90.

The presentation time packet 90 and the contents of the presentation time field 106 of the presentation time packet 90 are generated in the ingress network node 54. The presentation time field 106 contains information specifying when the first bit of the Ethernet frame packet 70 identified by the ID and SQ fields should be transmitted out of the egress network node 62. The presentation time in the presentation time field 106 for the presentation time packet 90 is selected to be a time greater than, or equal to, a sum of the packet creation time of the Ethernet frame packet 70, a maximum expected latency of the transport network 50 between the ingress node 54 and the egress node 62 and a guardband delay value. The maximum expected latency of the transport network 50 is determined by characterizing a network path between the ingress node 54 and the egress node 62, and in particular is an estimate of the maximum time it will take the Ethernet frame packet 70 to travel from the ingress network node 54 to the egress network node 62. The guardband delay value may include any processing delay that occurs at the egress node or various delay measurement inaccuracies. As such, the ingress network node 54 tracks the packet creation time for the Ethernet frame packet 70 and then selects a presentation time 106 that is greater than, or equal to, the tracked packet creation time, the maximum expected time required for the Ethernet frame packet 70 to travel from the ingress network node 54 to the egress network node 62 and the guardband delay value. In a particular embodiment, the presentation time 106 can be computed as a sum of the creation time of the Ethernet frame packet 70, a maximum expected time required for the Ethernet frame packet 70 to travel from the ingress network node 54 to the egress network node 62, plus an additional guardband delay value.

The frame check sequence field 108 follows the presentation time field 106. An interpacket gap 110 shown in dashed lines follows the packet as is known in the art, is not a part of the packet and is shown for reference.

The use of the presentation time packet 90 of FIG. 4 is a mechanism to synchronize operation of the ingress network node 54 and the egress network node 62 that is completely different from the prior art. The presentation time packet 90 is periodically sent to the corresponding egress network node 62 of each CBR client. As indicated above, the presentation time packet 90 specifies the presentation time at which the client payload data 84 in an Ethernet frame packet 70 with a particular SQ value is to be transmitted out of the egress node 62 into the egress CBR client stream 64. The rate at which the presentation time packets 90 are generated can be arbitrarily low. The presentation time (PT) of any future Ethernet frame packet SQ=N+M can be computed from the presentation time of Ethernet frame packet SQ=N using PT(N+M)=PT(N)+M*Tp, because segment sizes of the Ethernet frame packets are controlled to ensure that an Ethernet frame packet is created, on average, once every Tp time units. Similarly, the presentation time (PT) of any earlier Ethernet frame packet SQ=N−M can be computed from the presentation time of Ethernet frame packet SQ=N using PT(N−M)=PT(N)−M*Tp. In general, once the presentation time of an Ethernet frame packet of a CBR client stream is known, the presentation time of all earlier and future segment packets belonging to the same CBR client stream can be computed mathematically, using the above equations.

Presentation time packets 90 can be used by the egress network node 62 for initialization. The SQ field in the presentation time packets 90 refers to the sequence number of the packet in the CBR client stream. Since the egress network node 62 does not know when to transmit received Ethernet frame packets 70 until a presentation time packet 90 has been received, at start-up or initialization, the egress network node 62 discards all previously received Ethernet frame packets 70 until the receipt of a presentation time packet 90. Following the receipt of the presentation time packet 90, the presentation time for a next Ethernet frame packet 70 received is computed from the presentation time for a reference Ethernet packet of the first presentation time packet 90 using the equations above. Egress node 62 can delay transmission of the CBR payload contained in this Ethernet frame packet 70 until the local ToD is equal to or is greater than the computed presentation time. Because the bit rate of the CBR stream is recovered from the packet size (B−N, B, and B+N bytes/packet), all CBR payload in subsequent Ethernet frame packets naturally follows the CBR payload that was delayed, without requiring any additional delay, to establish a steady-state flow of the transmitted CBR stream. The information in subsequent Ethernet frame packets may then be used to verify that the presentation times of corresponding Ethernet frame packets are still properly time-aligned, to provide for error detection in the steady-state flow of the CBR stream. Accordingly, a misalignment may result if an error has disrupted the steady-state flow of the transmitted CBR stream.

During normal operation, the actual presentation time within egress CBR client stream 64 of data from Ethernet frame packets 70 whose SQ is identified in a presentation time packet 90 is compared with the time specified in the periodic presentation time packets 90 for performance monitoring purposes, in order to detect for loss of synchronization between the ingress network node 54 and egress network node 62. The CBR client is deemed to be in-synch when the difference between the actual and specified presentation times are within an expected window. When the difference is outside the window, the CBR client is deemed to be out of synchronization, which is an alarm condition.

Persons of ordinary skill in the art will appreciate that there is minimal real-time processing burden in the processing of presentation time packets. The presentation time packets 90 specifying the presentation time for SQ=X does not need to be processed by the egress network node 62 ahead of the transmission of that Ethernet frame packet 70 as part of the egress CBR client stream 64. If the processing of the presentation time packet for SQ=X completes when segment packet with SQ=X+k (k a positive integer) is awaiting transmission, its actual presentation time can be compared with a reference presentation time computed using the equation: Reference PT (X+k)=Reference PT(X)+k*Tp.

Figure 5:
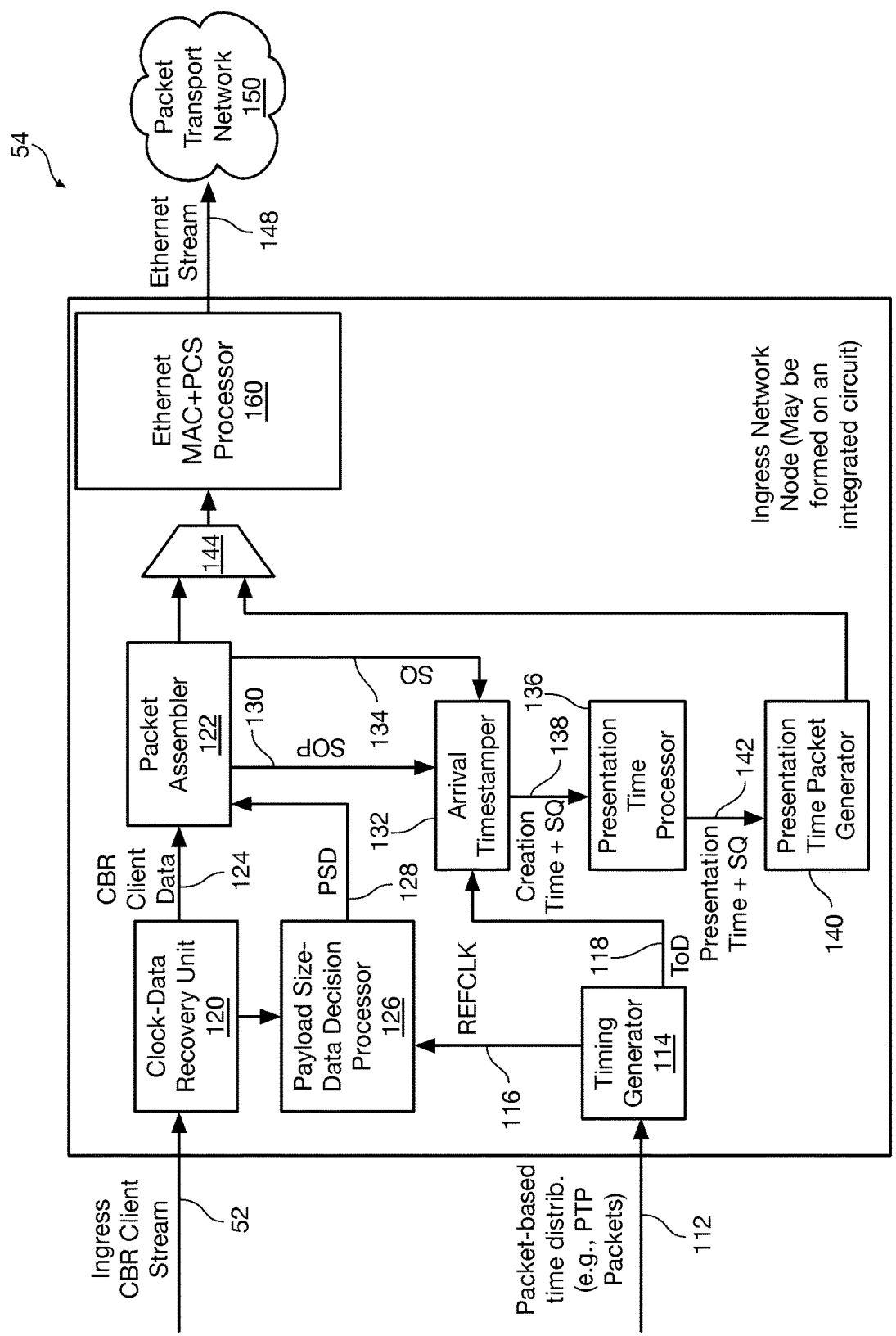
FIG. 5 is a block diagram illustrating an ingress network node configured in accordance with an embodiment of the invention.

Referring now to FIG. 5, a diagram shows the relevant portions of an ingress network node 54 in accordance with an aspect of the invention. In one embodiment ingress network node 54 is formed on an integrated circuit.

Packet-based time distribution packets such as IEEE 1588 PTP messages are received on line 112. Timing generator 114 is coupled to line 112 and generates an ingress reference clock (REFCLK) signal on line 116 and a Time of Day (ToD) signal for the ingress network node 54 on line 118. The timing generator 114 generates the ingress REFCLK signal and the ToD using the time distribution packets from the packet-based time distribution mechanism, such as IEEE 1588 PTP messages. The ingress REFCLK signal on line 116 and the ToD signal on line 118 are thus synchronized to the packet-based time distribution network.

The ingress CBR client stream 52 is coupled to a clock-data recovery unit (CDRU) 120. The CDRU 120 recovers CBR client data from the ingress CBR client stream 52 and measures the CBR client data bit rate of the ingress CBR client stream 52 and is commonly implemented using a phase locked loop (PLL). The CBR client data recovered from the ingress CBR client stream 52 by the CDRU 120 from the ingress CBR client stream 52 is provided to packet assembler 122, which is coupled to the CDRU 120 on line 124.

The measured CBR client data bit rate is coupled from the CDRU 120 to the payload size-data decision processor 126. The payload size-data decision processor 126 compares the measured CBR client data bit rate obtained from the CDRU 120 against the ingress reference clock REFCLK signal on line 116 and generates an output on line 128 as a sequence of payload size decisions (PSDs). In one embodiment of the invention the PSD values may be B−N, B, or B+N bytes. The payload size-data decision processor 126 generates a PSD once every fixed number of cycles of the ingress REFCLK signal on line 116, which is referred to as a packet period, to produce the PSDs for the CBR client payload 84 of each Ethernet frame packet 70. The PSDs are each coupled to the packet assembler 122 on the line 128. Different ingress CBR client streams 52, can have different packet periods. Packet periods may have durations of, for example, P/Q ingress reference clock REFCLK period (i.e., packet period=(P/Q)*ingress reference clock REFCLK period), where P and Q are integers used to express the packet periods as a function of the ingress reference clock REFCLK period.

The packet assembler 122 assembles packets that include payload regions having sizes as directed by the PSDs generated on line 128 by the payload size-data decision processor 126. The packet assembler 122 maintains a list, e.g., a FIFO, of PSDs delivered by the payload size-data decision processor 126.

The ingress network node 54 of the present embodiments includes features that are not found in prior art systems.

Each time the packet assembler 122 starts assembling a packet, it generates a start-of-packet (SOP) pulse on its output line SOP 130 that is coupled to an arrival timestamper 132. The packet assembler 122 also reports the sequence number of the packet on the SQ line 134 that is coupled to the arrival timestamper 132.

Upon receiving a SOP pulse, the arrival timestamper 132 captures the current ToD of the ingress network node 54 (coupled to it on line 118 from timing generator 114) at which the SOP pulse was received from the packet assembler 122 and enters it as a creation ToD, or a creation time, onto a creation time list. This creation time list and the sequence number SQ are coupled to a presentation time processor 136 on line 138.

The presentation time processor 136 periodically selects one packet out of the creation time list coupled from the arrival timestamper 132 and generates a presentation time for the selected one packet by adding a software configurable predetermined presentation time delay value to the ToD of the selected packet. The software configurable predetermined presentation time delay value is set to equal a time interval longer than the longest latency time that is expected to be encountered before the packet is received at the egress network node 62 that is the destination for the assembled CBR client Ethernet frame packets 70, plus a guardband value. This software configurable predetermined presentation time delay value can be determined empirically or by modeling the network 50 in which the system of the present invention will be used. The selected packet is identified by its SQ number and provided to a presentation time packet generator 140 on line 142.

The presentation time packet generator 140 assembles a presentation time packet (reference numeral 90 of FIG. 4) including the field 104 containing the sequence number (SQ) of the selected packet and the field 106 containing the generated presentation time of the selected packet, both supplied on line 142. The presentation time packet 90 of FIG. 4 is an example of a timing control packet, that is similar to an IEEE 1914.3 Radio Over Ethernet (RoE) timing control packet. As described above, the presentation time packets 90 are used for system initialization and for detecting loss of synchronization between the ingress node 54 and egress node 62. The presentation time packets 90 are periodically assembled by the presentation time packet generator 140 (e.g., once every 1,000 or 1,000,000 CBR client packets as non-limiting examples) and output to one input of a multiplexer 144.

In different embodiments of the invention the decision of which CBR client packet to identify by a presentation time packet 90 can be made in any of the arrival timestamper 132, the presentation time processor 136 or the presentation time packet generator 140. The only differences between these alternate embodiments is how much creation time information is necessary to be passed between the arrival timestamper 132, the presentation time processor 136 and the presentation time packet generator 140.

A second input of multiplexer 144 is coupled to the output of the packet assembler 122. The multiplexer 144 merges the CBR client data packets from the packet assembler 122 and the presentation time packets from the presentation time packet generator 140 onto a common packet stream. The merged packet stream at the output of the multiplexer 144 is coupled to an Ethernet media access control layer of IEEE 802.3 in combination with a physical coding sublayer of IEEE 802.3 (referred to herein as Ethernet MAC+PCS) 160. The Ethernet MAC+PCS 160 adds Ethernet overhead and suitable line coding to the merged packet stream to generate an Ethernet stream 148 comprising Ethernet frame packets 70 and presentation time packets 90 and transmits the Ethernet stream 148 into a packet transport network 150 to which it is coupled.

Figure 6:
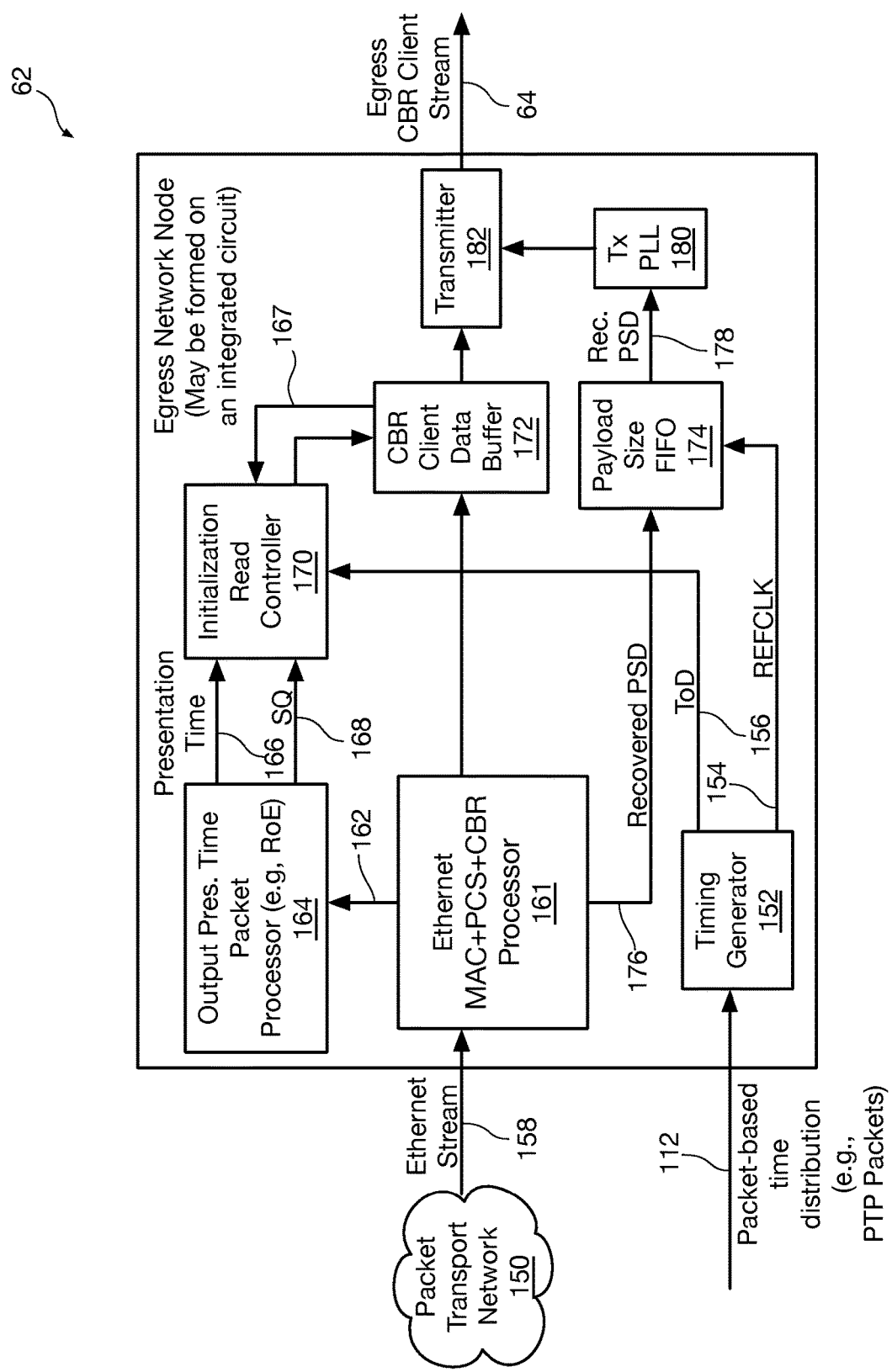
FIG. 6 is a block diagram illustrating an egress network node configured in accordance with an embodiment of the invention.

Referring now to FIG. 6, a diagram shows the relevant portions of an egress network node 62 in accordance with an aspect of the present invention.

As shown in FIG. 6, packet-based time distribution packets, such as IEEE 1588 PTP messages, are received on line 112 and coupled to a timing generator 152 of egress network node 62. Timing generator 152 is included in the egress network node 62 to provide an egress reference clock REFCLK signal and a ToD for the egress network node 62 that is phase locked to the ingress reference clock REFCLK signal of the ingress network node 54 of FIG. 5.

The timing generator 152 generates the egress reference REFCLK signal on line 154 and egress ToD signal on line 156, referenced to the time distribution packets from the packet-based time distribution mechanism, such as IEEE 1588 PTP messages. The egress reference clock REFCLK and egress ToD signals on respective lines 154 and 156 are thus synchronized to the packet-based time distribution network.

The incoming Ethernet stream 158 of Ethernet frame packets 70 and presentation time packets 90 from the packet transport network 150 is coupled to an Ethernet MAC+ PCS+CBR 161. The Ethernet MAC+PCS+CBR 161 performs standard Ethernet line code decoding and MAC termination processing. The Ethernet MAC+PCS+CBR 161 recovers presentation time packets 90, and couples the recovered presentation time packets 90 on line 162 to an output presentation time packet processor 164, which may be implemented by an RoE processor, where the presentation time of the selected packet and its sequence number (SQ) are extracted from the presentation time packet 90 and output on lines 166 and 168, respectively, and coupled to an initialization read controller 170. The initialization read controller 170 is also coupled to the ToD output line 156 of the timing generator 152.

The payload portion of the CBR client Ethernet data packets 70 containing the CBR client data is coupled from the Ethernet MAC+PCS+CBR processor 161 to a CBR client data buffer 172. The CBR client data buffer 172 maintains a FIFO of CBR client data extracted from the received Ethernet frame packets 70 and the sequence number (SQ) of the Ethernet frame packet 70 that delivered the CBR client data. A CBR processing function of the Ethernet MAC+PCS+CBR processor 161 identifies the number of bytes of CBR client data in each Ethernet frame packet 70 from the client payload field 84 of each CBR client Ethernet frame packet 70 to recover the PSD from each packet. The recovered PSD is coupled to a payload size FIFO 174 on a recovered PSD line 176. Upon initialization, the initialization read controller 170 instructs the CBR client data buffer 172 to discard all incoming CBR client Ethernet data packets 70 until it has received a presentation time packet 90 and inhibits the CBR client data buffer 172 from reading out from its FIFO until the ToD at the egress network node 62 equals or exceeds the presentation time (from line 166) extracted from the presentation time packet or calculated using the method previously described for the CBR client data at the head of the FIFO in CBR client data buffer 172. Once the system is running, the initialization read controller 170 monitors the presentation times 166 for selected packets provided to it by the output presentation time packet processor 164 and generates an alarm if the time that the CBR client data 167 clocked out of the CBR client data buffer 172 differs from the reference presentation time of the CBR client packet by more than a predetermined margin.

This operation of the egress network node 62 differs from certain prior art embodiments which do not employ an output presentation time packet processor 164, but instead obtain the Ethernet frame packet creation time from a timestamp field within the CBR overhead field of each packet and supplies that packet creation time directly to a read controller that adds to it a latency delay time to control the clocking of the CBR client data buffer 172 for each individual Ethernet frame packet.

The payload size FIFO 174 maintains a FIFO of recovered PSDs received from the Ethernet MAC+PCS+CBR processor 161 over line 176. The payload size FIFO 174 outputs a recovered PSD output on line 178 at packet period (Tp) intervals that are fixed and are controlled by the egress reference clock REFCLK signal received on line 154 from the timing generator 152. The packet period (Tp) at the egress network node 62 is configured to be equal to the packet period (Tp) at the ingress network node 54.

The recovered PSD (the number of bytes B−N, B, B+N, where e.g., N=1 in an exemplary embodiment) is output by the payload size FIFO 174 on line 178 as the reference phase increment to a transmit phase locked loop (Tx PLL) 180. The Tx PLL 180 generates the clock used by a transmitter 182 and couples the generated clock to the transmitter 182. Transmitter 182 transmits the contents of the CBR client data buffer 172 as the egress CBR client stream 64. Once every packet period (Tp), as determined by the egress reference clock REFCLK signal received on line 154, the recovered PSD is output from the payload size FIFO 174, placed on line 178 and used to control the Tx PLL 180 of the CBR client. Tp is measured as a multiple of the egress reference clock REFCLK signal period. It will be understood by persons of ordinary skill in the art that, for the invention to properly function, Tp at the ingress network node 54 of FIG. 5 should be the same time period, on average, as Tp at the egress network node 62 of FIG. 6. A sustained offset in the two Tp values would lead to FIFO underflow or overflow at the egress network node 62 CBR client data buffer 172 and result in a loss of synchronization between the CBR client rate at the ingress network node 54 and egress network node 62. Since Tp is measured using the ingress and egress reference clock REFCLK signals at the respective network nodes, advantageously the REFCLK signals generated by the timing generator 114 of the ingress network node 54 in FIG. 5 and the timing generator 152 of the egress network node 62 in FIG. 6 are phase locked to each other by packet-based time distribution.

Figure 7:
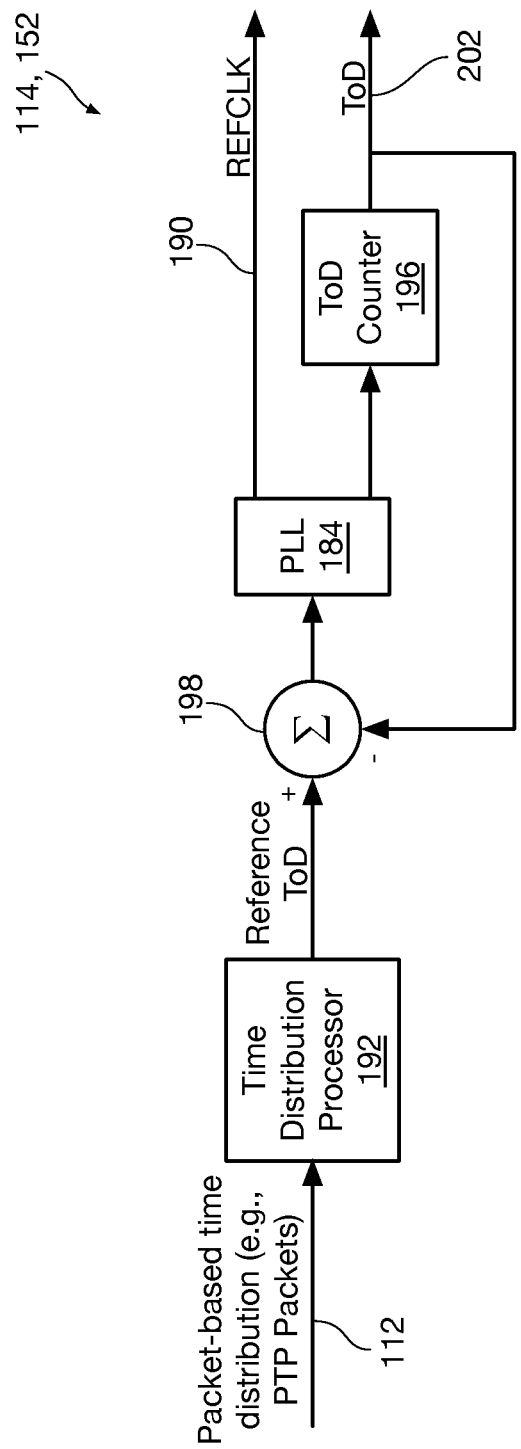
FIG. 7 is a block diagram illustrating an internal view a timing generator in an egress network node and an ingress network node configured in accordance with an embodiment of the invention.

Referring now to FIG. 7, a diagram shows some internal components of certain embodiments of the timing generator 114 of the ingress network node 52 of FIG. 5 and the timing generator 152 of the egress network node 62 of FIG. 6. As illustrated, in the timing generators 114, 152, a time distribution processor 192 extracts ToD information from a packet-based time distribution mechanism, such as IEEE 1588 PTP messages provided on line 112.

A PLL 184 is coupled to a (i.e. at the ingress network node 52 or at the egress network node 62) ToD counter 196. The reference ToD information extracted by the time distribution processor 192 is coupled to a subtractor 198. Subtractor 198 is arranged to subtract ToD information output from ToD counter 196 on line 202 from the reference ToD information output from time distribution processor 192, and couple the result, i.e. differential ToD information, to the PLL 184 and this differential ToD information is used to adjust the frequency of the PLL 184. The PLL 184 outputs a local reference clock REFCLK signal on line 190.

When the local ToD at output 202 of the local ToD counter 196 is ahead of the reference ToD at the output of the time distribution processor 192, the PLL 184 will slow down. Conversely, if the local ToD at the output 202 of the local ToD counter 196 is behind the reference ToD at the output of the time distribution processor 192, the PLL 184 will speed up. When the timing generators in the ingress and egress network nodes 54 and 62 are referenced to a common packet-based time distribution mechanism such as a PTP reference clock master, the ingress and egress network nodes 54 and 62 will share a common ToD and their respective REFCLK signals will be phase locked to each other.

Figure 8:
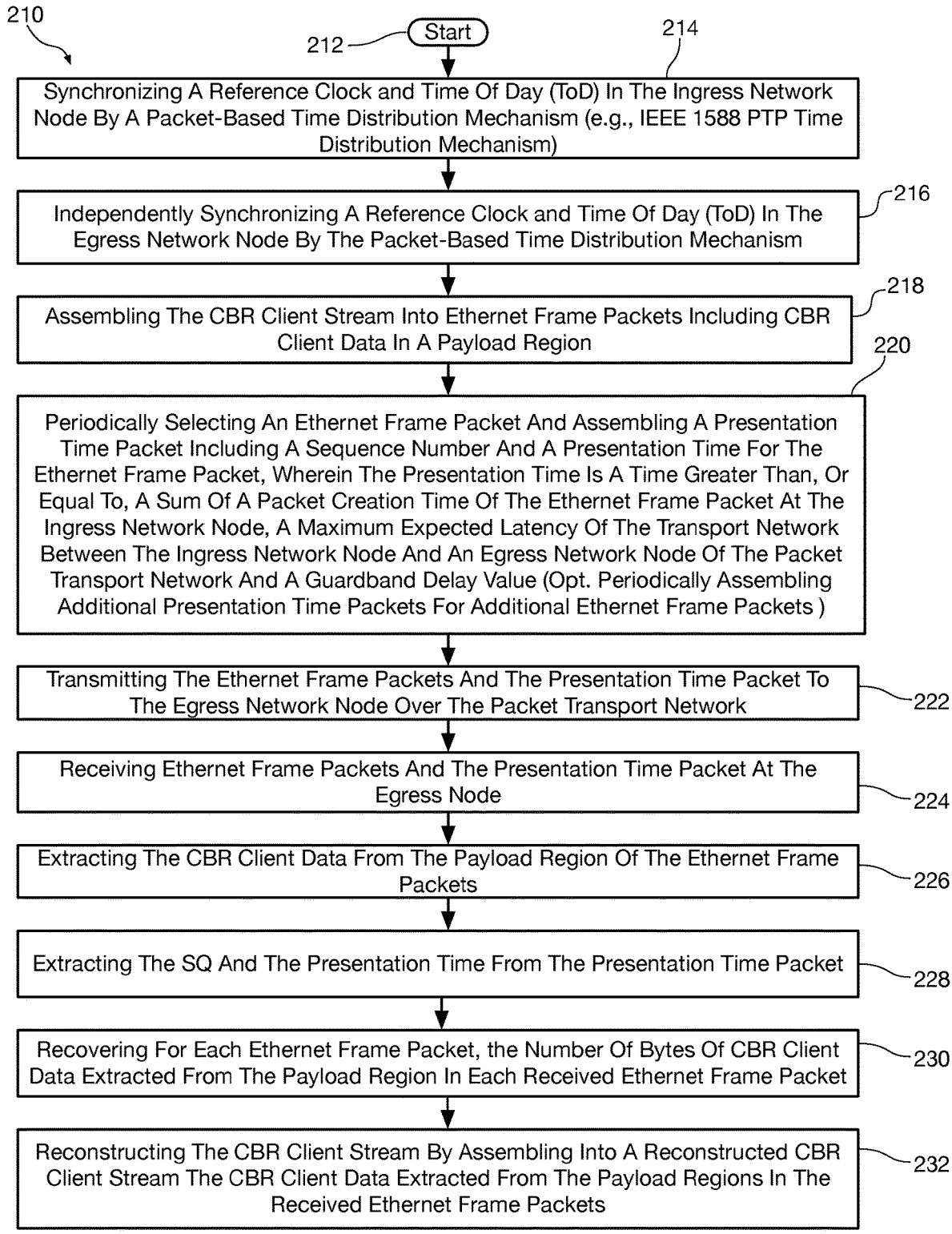
FIG. 8 is a flow diagram illustrating a method for transporting a constant bit rate (CBR) client stream over a packet transport network from an ingress network node to an egress network node separated by an arbitrary distance across the packet transport network, the ingress network node having an ingress reference clock and the egress network node having an egress reference clock that is independent from the ingress reference clock, in accordance with an embodiment of the invention.

Referring now to FIG. 8, a flow diagram shows an illustrative method 210 for transporting a constant bit rate (CBR) client stream over a packet transport network from an ingress network node to an egress network node separated by an arbitrary distance across the packet transport network, the ingress network node having an ingress reference clock and the egress network node having an egress reference clock, isolated from the ingress reference clock, in accordance with an aspect of the invention. The method starts at reference numeral 212.

At reference numeral 214 the method includes synchronizing the reference clock and time of day (ToD) in the ingress network node by a packet-based time distribution mechanism (e.g. an IEEE 1588 PTP time distribution mechanism). At reference numeral 216, the method includes independently synchronizing the reference clock and ToD in the egress network node by the packet-based time distribution mechanism. In a particular embodiment of the invention, the reference clock and ToD synchronization is carried out in both the ingress network node 54 and the egress network node 62 of FIGS. 5 and 6 using the timing generators 114 and 152, an exemplary embodiment of which is depicted in FIG. 7.

At reference numeral 218, the method includes assembling the CBR client stream into Ethernet frame packets including CBR client data in a payload region. At reference numeral 220, the method includes periodically selecting an Ethernet frame packet and assembling a presentation time packet including a sequence number and a presentation time for the Ethernet frame packet. In an example embodiment of the invention, the presentation time packet is assembled using the arrival timestamper 132, the presentation time processor 136 and the presentation time packet generator 140, as described with reference to FIG. 5. In accordance with the invention, at reference numeral 220 additional presentation time packets are periodically assembled for additional selected Ethernet frame packets. In example embodiments of the invention, presentation time packets are assembled, e.g., between once every 1,000 and once every 1,000,000 CBR client packets.

At reference numeral 222, the method includes transmitting the Ethernet frame packets and the presentation time packet to the egress network node over the packet transport network. In an example embodiment of the invention, the assembled Ethernet frame packets and the presentation time packet are transmitted to the egress network node by the Ethernet MAC+PCS processor 160 in FIG. 5.

At reference numeral 224, the method includes receiving the Ethernet frame packets and the presentation time packet at the egress node. At reference numeral 226, the method includes extracting the CBR client data from the payload region of each received Ethernet frame packet. In an example embodiment of the invention, the received Ethernet frame packets and the presentation time packet are received at the egress network node 62 by the Ethernet MAC+PCS+CBR processor 161 and the extracted CBR client data is stored in the CBR client data buffer 172 in FIG. 6.

At reference numeral 228, the method includes extracting the SQ and the presentation time from the presentation time packet. At reference numeral 230, the method includes recovering, for each Ethernet frame packet, the number of bytes of CBR client data extracted from the payload region in each received Ethernet frame packet. In an example embodiment of the invention, the number of bytes, i.e. the PSD, for each Ethernet frame packet is recovered by the Ethernet MAC+PCS+CBR processor 161 in FIG. 6.

At reference numeral 232, the method includes reconstructing the CBR client stream by assembling into a reconstructed CBR client stream the CBR client data extracted from the payload regions in the received Ethernet frame packets. In an example embodiment of the invention, the CBR client data is assembled into a reconstructed CBR client stream by the transmitter 182 clocked by the transmitter PLL 180 using a recovered PSD that has been read from the payload size FIFO 174 in FIG. 6.

Figure 9:
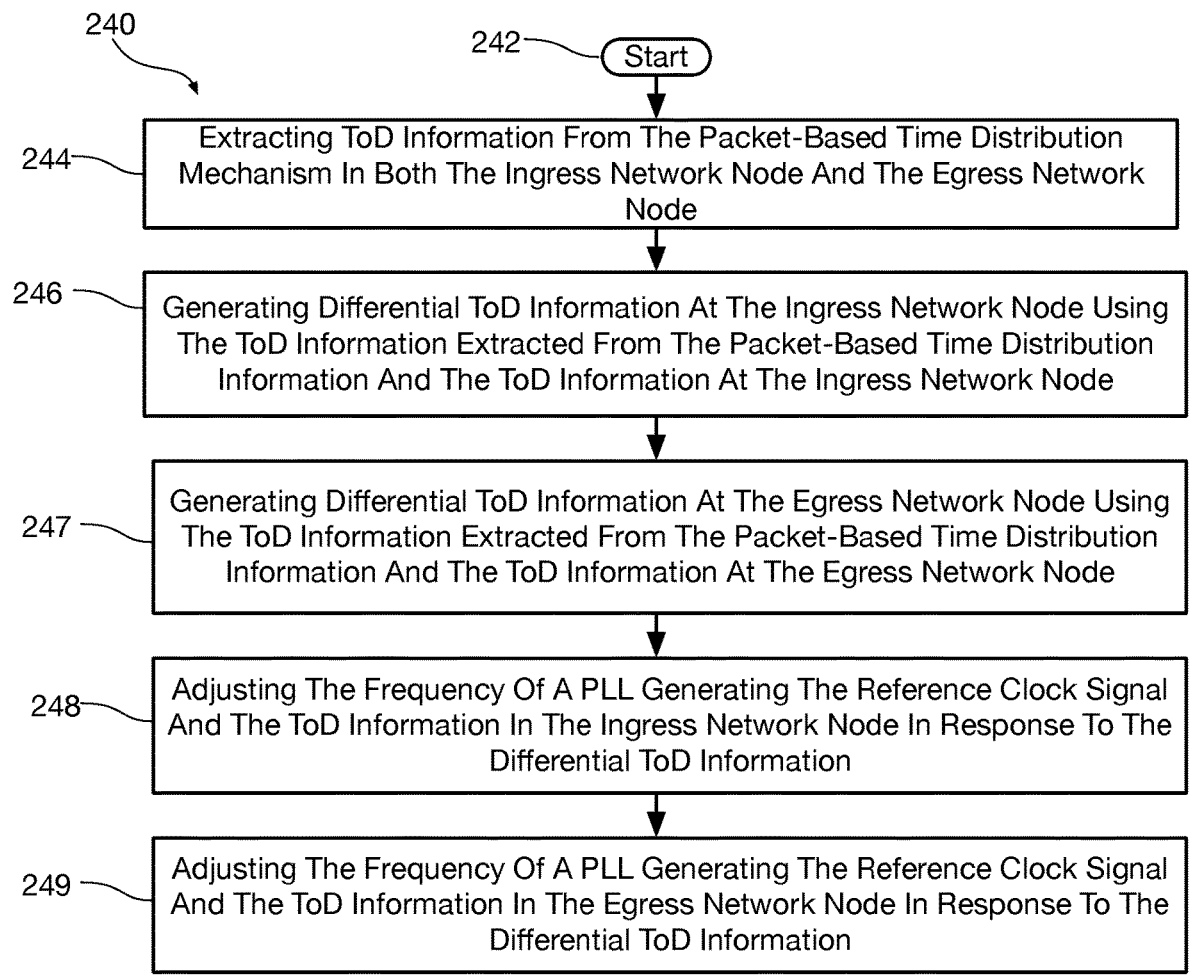
FIG. 9 is a flow diagram illustrating a method for independently synchronizing the reference clock and ToD of the ingress network node and the egress network node to a packet-based time distribution mechanism, in accordance with an embodiment of the invention.

Referring now to FIG. 9, a flow diagram shows an illustrative method 240 for independently synchronizing the reference clock and ToD in both the ingress network node 54 and the egress network node 62 to the packet-based time distribution mechanism in accordance with an aspect of the invention. The method starts at reference numeral 242.

At reference numeral 244, the method includes extracting ToD information from the packet-based time distribution mechanism in both the ingress network node and the egress network node. In one embodiment, the packet-based time distribution information is in accordance with an IEEE 1588 PTP time distribution mechanism. In an exemplary embodiment of the invention, the ToD information is extracted from the packet-based time distribution mechanism by the time distribution processor 192 in the timing generators 114 and 152.

At reference numeral 246, the method includes generating ToD information at the ingress network node using the ToD information extracted from the packet-based time distribution mechanism and the ToD at the ingress network node. In the example embodiment of the invention shown in FIG. 7, the subtractor 198 receives, as inputs, the ToD information for the ingress network node stored in ToD counter 196 and the ToD information extracted from the packet-based time distribution mechanism and the subtractor 198 generates the differential ToD information as an output signal that is equal to the difference between the input signals.

At reference numeral 247, the method includes generating ToD information at the egress network node using the ToD information extracted from the packet-based time distribution mechanism and the ToD at the egress network node. In the example embodiment of the invention shown in FIG. 7, the subtractor 198 receives, as inputs, the ToD information for the egress network node stored in ToD counter 196 and the ToD information extracted from the packet-based time distribution mechanism and the subtractor 198 generates the differential ToD information as an output signal that is equal to the difference between the input signals.

At reference numeral 248, the method includes adjusting the frequency of a PLL generating the reference clock signal and the ToD information in the ingress network node in response to the differential ToD information. In an example embodiment of the invention, the frequency of the PLL 184 generating the reference clock signal REFCLK and the ToD information at the ingress network node 54 is adjusted using the output of the subtractor 198.

At reference numeral 249, the method includes adjusting the frequency of a PLL generating the reference clock signal and the ToD information in the egress network node in response to the differential ToD information. In an example embodiment of the invention, the frequency of the PLL 184 generating the reference clock signal REFCLK and the ToD information at the egress network node 62 is adjusted using the output of the subtractor 198.

Figure 10:
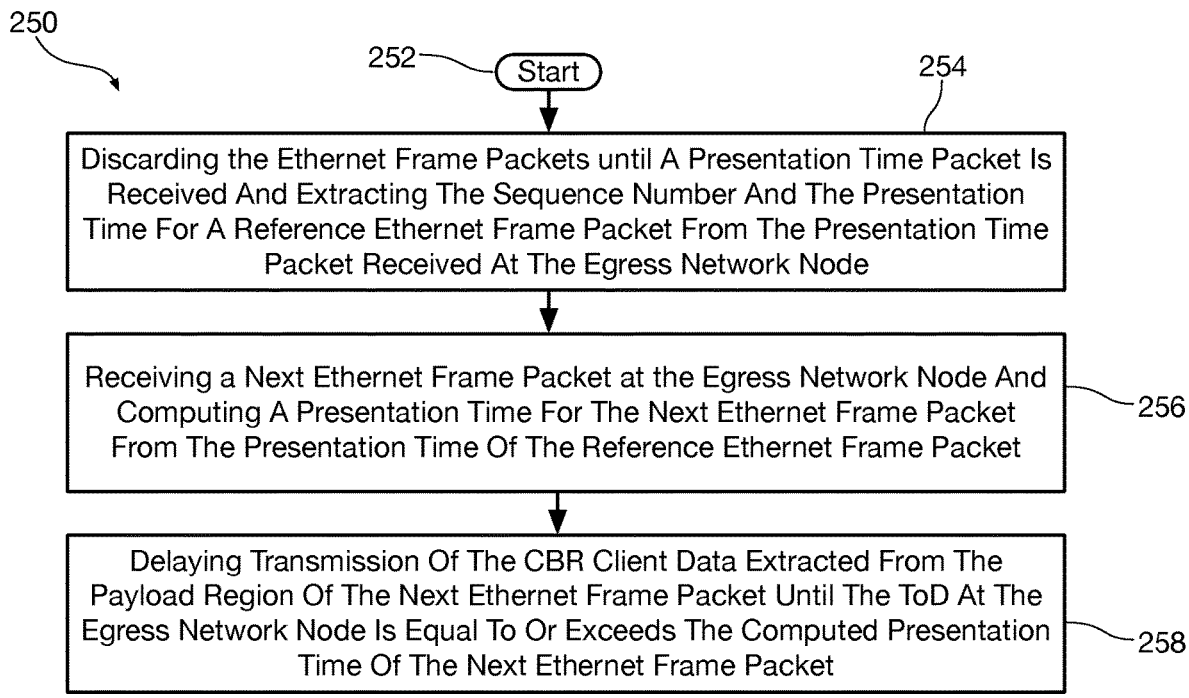
FIG. 10 is a flow diagram illustrating a method utilizing a presentation time packet at the egress network node for reconstructing the CBR client stream, in accordance with an embodiment of the invention.

Referring now to FIG. 10, a flow diagram that shows an illustrative method 250 for use at the egress network node that is performed during system initialization using a presentation time packet for reconstructing the CBR client stream from the Ethernet frame packets in accordance with an aspect of the invention. The method begins at reference numeral 252.

At reference numeral 254, the method includes discarding the Ethernet frame packets until a presentation time packet is received and extracting the sequence number and the presentation time for a reference Ethernet frame packet from the presentation time packet received at the egress network node. In an example embodiment of the invention, the sequence number and the presentation time for the reference Ethernet frame packet are extracted from the received presentation time packet using the output presentation time packet processor 164 of FIG. 6.

At reference numeral 256, the method includes receiving a next Ethernet frame packet at the egress network node and computing a presentation time for the next Ethernet frame packet from the presentation time of the reference Ethernet frame packet.

At reference numeral 258, the method includes delaying transmission of the CBR client data extracted from the payload region of the Ethernet frame packet until the ToD at the egress network node equals or exceeds the presentation time computed for the next Ethernet frame packet. In an example embodiment of the invention, transmission of the CBR client data extracted from the payload region of the next Ethernet frame packet is delayed until the ToD at the egress network node equals or exceeds the presentation time computed for the next Ethernet frame packet using the initialization read controller 170 that controls readout of CBR client data from the CBR client data buffer 172 of FIG. 6.

Figure 11:
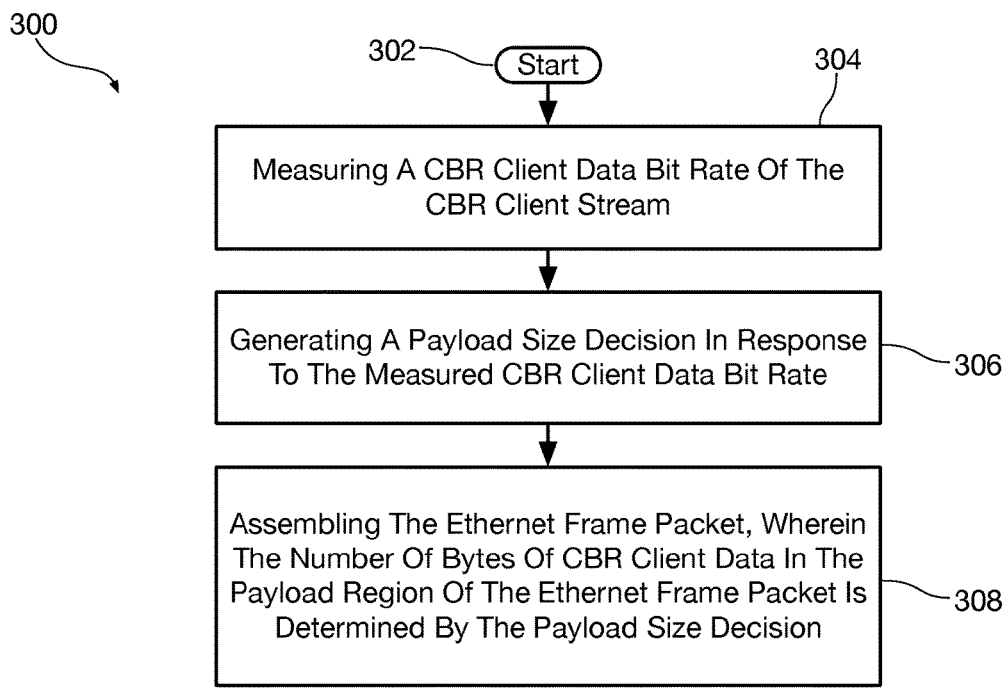
FIG. 11 is a flow diagram illustrating a method for assembling Ethernet frame packets from a CBR client stream, in accordance with an embodiment of the invention.

Referring now to FIG. 11, a flow diagram 300 illustrating additional method steps for step 218 of FIG. 8 for assembling the CBR client stream into Ethernet frame packets including CBR client data in a payload region, in accordance with an aspect of the invention. The method begins at reference numeral 302.

At reference numeral 304, the method includes measuring a CBR client data bit rate of the CBR client stream and at reference numeral 306, the method continues by generating a payload size decision in response to the measured CBR client data bit rate. The method continues at reference numeral 308 by assembling the Ethernet frame packet, wherein the number of bytes of CBR client data in the payload region of the Ethernet frame packet is determined by the payload size decision. In an example embodiment, the CDRU 120 of FIG. 2 measures the CBR client data bit rate of the ingress CBR client stream 52 and the payload size-data decision processor 126 uses the measured CBR client data bit rate to determine the payload size decision 126, which is provided to the packet assembler 122 to assemble the CBR client stream into Ethernet frame packets.

Persons of ordinary skill in the art will appreciate that other embodiments of the invention are contemplated in which the presentation time packets include creation time information for the Ethernet frame packet and the calculation of presentation time is then performed at the egress network node 62 using the software configurable predetermined presentation time delay value that has been previously mentioned.

As will be appreciated by persons of ordinary skill in the art, the IEEE 1588 PTP and IEEE 1914.3 ROE standards are mentioned herein by way of example. Persons of ordinary skill in the art will appreciate that PTP is one example of a packet-based time distribution mechanism and describes a protocol that distributes ToD to multiple nodes in the network. Similarly, ROE is another example of a protocol used for output presentation time, controlled by timing control packets to determine the presentation time of the bits in a packet. Such skilled persons will readily understand that other protocols serving the same functions can be substituted without affecting the functionality of this invention.

The latency of a packet transport network can vary depending on loading. Using known techniques such as assigning higher priority to CBR segment packets, IEEE 802.1 Qbu Frame Preemption and IEEE802.1 Qbv Time Sensitive Scheduling, the range between the minimum and maximum latency experience by a CBR client can be minimized. However, the egress network node 62 must still tolerate a range of latencies. To initialize the depth of the CBR client data buffer 172 in the egress network node, the minimum and maximum network latency should preferably be measured. Methods to perform this measurement are known in the art. The ingress and egress network nodes 54 and 62 can use a network delay measurement technique similar to ITU-T Y.1731 to initialize the depth of its de-jitter buffer at the egress network node 62.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for transporting a constant bit rate (CBR) client stream over a packet transport network, the method comprising:
    synchronizing a reference clock signal and a time of day (ToD) at an ingress network node of the packet transport network to a packet-based time distribution mechanism;
    independently synchronizing a reference clock signal and a ToD at an egress network node of the packet transport network to the packet-based time distribution mechanism;
    assembling a presentation time packet for an Ethernet frame packet of a CBR client stream at the ingress network node, the presentation time packet including a sequence number and a presentation time for the Ethernet frame packet, wherein the Ethernet frame packet comprises a payload region having a number of bytes of CBR client data from the CBR client stream; and
    transmitting the Ethernet frame packet and the presentation time packet to the egress network node over the packet transport network.

2. The method of claim 1 further comprising, multiplexing the Ethernet frame packet and the presentation time packet prior to transmitting the Ethernet frame packet and the presentation time packet to the egress network node over the packet transport network.

3. The method of claim 1 further comprising:
    measuring a CBR client data bit rate of the CBR client stream;
    generating a payload size decision in response to the measured CBR client data bit rate; and
    assembling the Ethernet frame packet, wherein the number of bytes of CBR client data in the payload region of the Ethernet frame packet is determined by the payload size decision.

4. The method of claim 1, wherein the presentation time of the presentation time packet is a time greater than or equal to a sum of a packet creation time of the Ethernet frame packet at the ingress network node, a maximum expected latency of the packet transport network between the ingress network node and the egress network node and a guardband delay value.

5. The method of claim 1, wherein the packet-based time distribution mechanism is an IEEE 1588 Precision Time Protocol (PTP) time distribution mechanism.

6. The method of claim 1, wherein the reference clock signal is generated by a phase-locked loop (PLL) at the ingress network node and wherein synchronizing the reference clock signal and the ToD at the ingress network node to the packet-based time distribution mechanism comprises:
    receiving the packet-based time distribution mechanism at the ingress network node;
    extracting the ToD from the packet-based time distribution mechanism;
    generating differential ToD information using the ToD extracted from the packet-based time distribution mechanism and the ToD at the ingress network node; and
    adjusting a frequency of the PLL at the ingress network node and the ToD at the ingress network node in response to the differential ToD information.

7. The method of claim 1, wherein the reference clock signal at the egress network node is generated by a phase-locked loop (PLL) and wherein synchronizing the reference clock signal and the ToD at the egress network node to the packet-based time distribution mechanism comprises:
    receiving the packet-based time distribution packets at the egress network node;
    extracting the ToD from the packet-based time distribution packets;
    generating differential ToD information using the ToD extracted from the packet-based time distribution mechanism and ToD at the egress network node; and
    adjusting a frequency of the PLL at the egress network node and the ToD at the egress network node in response to the differential ToD information.

8. The method of claim 1, wherein assembling the presentation time packet for the Ethernet frame packet further comprises periodically assembling additional presentation time packets each including a respective sequence number and presentation time for additional Ethernet frame packets.

9. The method of claim 8, further comprising:
    receiving the Ethernet frame packets, each comprising the payload region having the number of bytes of CBR client data from the CBR client stream, and the presentation time packets at the egress network node;
    extracting the number of bytes of CBR client data from the payload region of each received Ethernet frame packet; and reconstructing the CBR client stream by assembling the extracted number of bytes of CBR client data from the payload region of each received Ethernet frame packet into a reconstructed CBR client stream.

10. The method of claim 9 wherein reconstructing the CBR client stream by assembling the extracted number of bytes of CBR client data from the payload region of each received Ethernet frame packet into the reconstructed CBR client comprises:
discarding the received Ethernet frame packets until the presentation time packet is received;
extracting the sequence number and the presentation time from the received presentation time packet for a reference Ethernet frame packet;
receiving a next Ethernet frame packet;
computing a presentation time for the extracted number of bytes of CBR client data from the payload region of the next Ethernet frame packet; and
delaying the transmission of the CBR client data extracted from the payload region of the next Ethernet frame packet until the ToD at the egress network node equals or exceeds the computed presentation time of this Ethernet frame packet.

11. A method for transporting a constant bit rate (CBR) client stream over a packet transport network, the method comprising:
selecting an Ethernet frame packet from a CBR client stream received at an ingress network node of the packet transport network, wherein the Ethernet frame packet comprises a payload region having a number of bytes of CBR client data from the CBR client stream;
assembling a presentation time packet for the Ethernet frame packet at the ingress network node, the presentation time packet including a sequence number and a presentation time for the Ethernet frame packet, wherein the presentation time is a time greater than, or equal to, a sum of a packet creation time of the Ethernet frame packet at the ingress network node, a maximum expected latency of the transport network between the ingress network node and an egress network node of the packet transport network and a guardband delay value; and
transmitting the Ethernet frame packet and the presentation time packet to the egress network node over the packet transport network.

12. The method of claim 11, further comprising:
synchronizing a reference clock signal and a time of day (ToD) at the ingress network node of the packet transport network to a packet-based time distribution mechanism; and
independently synchronizing a reference clock signal and a ToD at the egress network node of the packet transport network to the packet-based time distribution mechanism.

13. The method of claim 11 further comprising:
measuring a CBR client bit rate of the CBR client stream;
generating a payload size decision in response to the measured CBR client bit rate; and
assembling the Ethernet frame packet, wherein the number of bytes of CBR client data in the payload region is determined by the payload size decision.

14. A system for transporting Ethernet frame packets assembled from a constant bit rate (CBR) client stream over a packet transport network, the system comprising:
an ingress network node coupled to an egress network node through the packet transport network;
a first timing generator in the ingress network node that generates a reference clock signal and a time of day (ToD) that are synchronized by a packet-based time distribution mechanism;
a second timing generator in the egress network node that independently generates a reference clock signal and a ToD that are synchronized to the packet-based time distribution mechanism;
a packet assembler in the ingress network node, the packet assembler configured to receive CBR client data from the CBR client stream and to assemble Ethernet frame packets from the CBR client data, each Ethernet frame packet including a payload region having a number of bytes of CBR client data from the CBR client stream, the packet assembler further configured to generate a sequence number (SQ) for each Ethernet frame packet;
a presentation time packet generator in the ingress network node coupled to the packet assembler, the presentation time packet generator configured to generate a presentation time packet for a Ethernet frame packet, the presentation time packet including the sequence number (SQ) of the Ethernet frame packet and a presentation time for the Ethernet frame packet; and
a multiplexer coupled to the packet assembler and to the presentation time packet generator, the multiplexer arranged to multiplex the generated presentation time packet and the Ethernet frame packets for transmission to the packet transport network.

15. The system of claim 14, wherein the packet-based time distribution mechanism is an IEEE 1588 Precision Time Protocol (PTP) time distribution mechanism.

16. The system of claim 14, wherein the packet assembler is further configured to generate a start-of-packet (SOP) pulse each time the packet assembler starts assembling an Ethernet frame packet, the ingress network node further comprising:
an arrival timestamper coupled to the first timing generator in the ingress node and to the packet assembler, the arrival timestamper configured to capture and record a creation time for the Ethernet frame packet that corresponds to a generated ToD at which the start-of-packet pulse was received from the packet assembler and to record the sequence number of the Ethernet frame packet coupled to it from the packet assembler; and
a presentation time processor coupled to the arrival timestamper, the presentation time processor to calculate the presentation time for the Ethernet frame packet, wherein the presentation time is a time greater than or equal to a sum of the packet creation time of the Ethernet frame packet, a maximum expected latency of the packet transport network between the ingress network node and the egress network node and a guardband delay value.

17. The system of claim 14, wherein the ingress network node further comprises:
a clock-data recovery unit configured to receive the CBR client stream, to measure a CBR client data bit rate of the CBR client stream and to recover the CBR client data from the CBR client stream;
a payload size-data decision processor coupled to the clock-data recovery unit and to the first timing generator, the payload size-data decision digital signal processor configured to generate a payload size decision in response to the measured CBR client data bit rate and to provide the payload size decision to the packet assembler; and an Ethernet media access control layer (MAC) and physical coding sublayer (PCS) processor coupled to the packet assembler, the Ethernet MAC+PCS processor configured to transmit the Ethernet frame packets over the packet transport network.

18. The system of claim 14, wherein the egress network node further comprises:
an Ethernet media access control layer (MAC) and physical coding sublayer (PCS) and CBR processor coupled to the packet transport network, the Ethernet MAC+PCS+CBR processor configured to receive the transmitted Ethernet frame packets and the presentation time packet and to recover the CBR client data from the CBR client data payload, the sequence number, and a payload size decision from each of the Ethernet frame packets;
an output presentation time packet processor coupled to the Ethernet MAC+PCS+CBR processor, the output presentation time packet processor configured to discard the Ethernet frame packets until the presentation time packet is received and to retrieve the sequence number and a presentation time for the Ethernet frame packet from the received presentation time packet;
a CBR client data buffer coupled to the Ethernet MAC+PCS+CBR processor, the CBR client data buffer to receive the recovered CBR client data from the Ethernet MAC+PCS+CBR processor;
an initialization read controller coupled to the second timing generator and to the output presentation time packet processor, the initialization read controller to receive the ToD generated by the second timing generator and to receive the presentation time and the sequence number retrieved by the output presentation time packet processor, the initialization read controller further coupled to the CBR client data buffer, the initialization read controller configured to compute a presentation time for a next Ethernet frame packet and to delay the CBR client data buffer from reading out recovered CBR client data from the transmitted Ethernet frame packets until the ToD at the egress network node equals or exceeds the presentation time for the next Ethernet frame packet;
a transmitter coupled to the CBR client data buffer, the transmitter configured to transmit data read from the CBR client data buffer as the CBR client stream;
a payload size first-in first-out (FIFO) coupled to the timing generator and to the Ethernet media access control layer and physical coding sublayer, the payload size FIFO configured to receive the recovered payload size decision from the Ethernet media access control layer and physical coding sublayer, and to maintain a list of payload size decisions recovered by the Ethernet media access control layer and physical coding sublayer;
a transmitter phase-locked loop coupled to the payload size FIFO; and
a transmitter coupled to the transmitter phase-locked loop and to the CBR client data buffer, the transmitter phase-locked loop configured to clock data read from the CBR client buffer to the transmitter in response to the recovered payload size decision from the payload size FIFO.

19. The system of claim 14, wherein the first timing generator in the ingress network node is coupled to the packet-based time distribution mechanism and the first timing generator in the ingress node is configured for extracting a ToD from the packet-based time distribution mechanism, for generating differential ToD information using the ToD extracted from the packet-based time distribution mechanism and the ToD at the ingress network node and for adjusting a frequency of the timing generator at the ingress network node and the ToD at the ingress network node in response to the differential ToD information.

20. The system of claim 14, wherein the second timing generator in the egress network node is coupled to the packet-based time distribution mechanism and the second timing generator in the egress node is configured for extracting a ToD from the packet-based time distribution mechanism, for generating differential ToD information using the ToD extracted from the packet-based time distribution mechanism and the ToD at the egress network node and for adjusting a frequency of the second timing generator at the egress network node and the ToD at the egress network node in response to the differential ToD information.

* * * * *